United States Patent [19]
Ogiso et al.

[11] 3,733,117
[45] May 15, 1973

[54] FILM-TAPE SYNCHRONIZATION SYSTEM

[75] Inventors: Mitsutoshi Ogiso, Kawaski-shi, Kanagawa-ken; Takashi Itani, Ota-ku, Tokyo; Kiyoshi Takahashi, Kunitachi-shi, Tokyo, all of Japan

[73] Assignee: Canon Kabushiki Kaisha, Shimomaruko, Ota-ku, Tokyo, Japan

[22] Filed: July 26, 1971

[21] Appl. No.: 165,999

[30] Foreign Application Priority Data

July 24, 1970 Japan..............................45/64859

[52] U.S. Cl................................................352/22
[51] Int. Cl..........................................G03b 31/04
[58] Field of Search..................352/12, 15, 16, 17, 352/22

[56] References Cited

UNITED STATES PATENTS 3,620,609    11/1971    John..............................352/17

Primary Examiner—Samuel S. Matthews
Assistant Examiner—Michael L. Gellner
Attorney—David Toren et al.

[57] ABSTRACT

In the disclosed system, a control circuit drives a projector by comparing the speed of the projector with the rate of clock signals from a pulse generator. When the projector reaches a start index on the film a detector disables the pulse generator so that the control circuit stops the projector. At the same time the detector connects the control circuit to the tape which has clock signals recorded along with the sound. As soon as the tape reaches the point where the sound and clock signals begin the control circuit restarts the projector and keeps it running in synchronism with the tape.

14 Claims, 3 Drawing Figures

//3,733,117

FILM-TAPE SYNCHRONIZATION SYSTEM

BACKGROUND OF THE INVENTION

The present invention relates to a synchronized playback system for synchronously reproducing a recorded film such as a cinematographic film and a recorded tape using a synchronization signal, and more particularly relates to a system for synchronously preproducing the film and the tape precisely by phase comparison of reproduced synchronization signal which has been recorded on a magnetic tape at a time of photographing and so on with a signal corresponding to a film speed at the time of projection of the film.

In a conventional synchronization play-back system, the tape speed of a tape recorder is detected as a rotational speed and the film speed of a film projector is detected as a rotational speed, and these detected rotational speeds are compared with each other and their difference actuates a switch to short a electro-magnetic field of a motor of the projector for synchronization. However, in this type of conventional system, high degree of skill is required for the synchronization and adjustment, and such system fail to give sufficiently precise synchronization during play-back of the system. Furthermore several film-tape synchronization systems using synchronization signal have been proposed, but they have been found insufficient in their performance and reliability and operational easiness.

An object of the present invention is to furnish a film-tape synchronization system which overcomes the above defects of the conventional systems.

SUMMARY OF THE INVENTION

According to the present invention, a train of pulse signals recorded together with sound signals on a tape is detected from the tape to turn on a driving motor of the projector by means of a thyristor, and a train of pulse signals from the the projector and corresponding to the film speed is detected to turn off the driving motor by means of a transistor which is connected in series with the thyristor.

Further according to the present invention, a circuit for converting a train of pulse signals of opposite polarity from a tape recorder to a train of signals of the same polarity is provided to detect the train of signals of the same polarity through the converting circuit, and an output therefrom turns on a driving motor at the side of the projector by its output and a train of pulse signal from the side of the projector and corresponding to the film is detected to turn off the driving motor by the output. As the present invention is provided with an automatic electronic control in the synchronization system, error in speed detection and mechanical delay in speed control are avoided.

The present invention shall be described in reference to the attached drawings.

DESCRIPTION OF PREFERRED EMBODIMENTS

Figure 1:
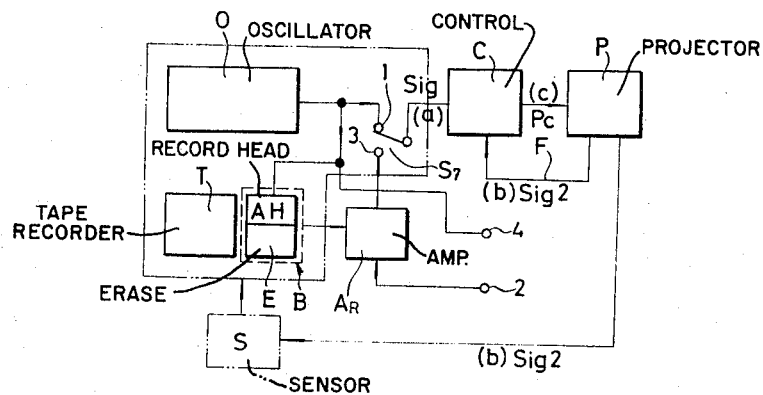
FIG. 1 is a block diagram illustrating the film-tape synchronization system of the present invention.

Referring to FIG. 1, which is a block diagram of the system in which after-recording of sound is effected during the projection of a film and projection of a film is effected during play-back of a tape recorder, P is a projector, C is a controlling circuit, F is a feed-back path, O is an oscillator, AR is an amplifier, T is a tape recorder, B is a synchronization box provided with a recording head AH for synchronization signal and a reproducing head of the signal and an eraser circuit E and so on. The synchronization box may be set in the tape recorder T. The various elements of the synchronization system shown in FIG. 1 may be integrated into a single unit as a sound projector or may be provided separately. A changeover switch $S_7$ switches the system from its condition of recording synchronization signals shown in FIG. 1 to its reproducing condition of the synchronization signal. By the changing over of the switch $S_7$, the output signal of the oscillator O is cut off and a reproduced output of the synchronization signal recorded in the synchronization box is put in the controlling circuit C through the amplifier AR. The switch $S_7$ also serves to bring back the reproducing condition to the recording condition.

A sensing circuit S is provided for starting the tape at the time of the start of the film so as to match the start point of the recorded tape with the start point of the recorded film. For this purpose, at the start point of the film is provided a notch or opening or an signal frame for producing a start signal to start the delivery of a reference output pulse signal of the tape to the controlling circuit C. This matching operation is carried out under the reproducing condition of the system.

For assuring this matching operation, the recording must be started at the time of the start of projection for the after recording.

Next explanation will be made on one example of using the present inventive system.

The present system is used for recording and reproducing sound signals lip synchronized with a cine film previously photographed. The switch $S_7$ is connected to a terminal 1 as shown in FIG. 1. In this state, lip synchronized sounds are produced during projection of the cine film previously photographed. The sounds are applied to the amplifying circuit AH of the synchronization box B together with the reference output pulses from the oscillator O through the amplifier AR from the terminal 2, and recorded on the sound track of the tape of the tape recorder T.

Then for reproducing the sounds, the switch $S_7$ is connected to the terminal 3, and when the tape recorder T and the projector P are actuated, the sound signal recorded in the tape recorder T is reproduced by an additional unit (not shown) connected to the terminal 4 through the amplifying circuit AH. The reference output pulse signal recorded on the tape is amplified by the amplifier AR and applied to the control circuit C through the switch $S_7$ connected to the terminal 3. In the control circuit C, the reference output signal is compared with an output signal corresponding to the film speed of the projector P and applied through the feed-back path F. Thus the control circuit C supplies the projector P with power in proportion to the phase difference between these two output signals and controls the rotational speed of a driving motor of the projector P to synchronize the tape with the film.

Figure 2:
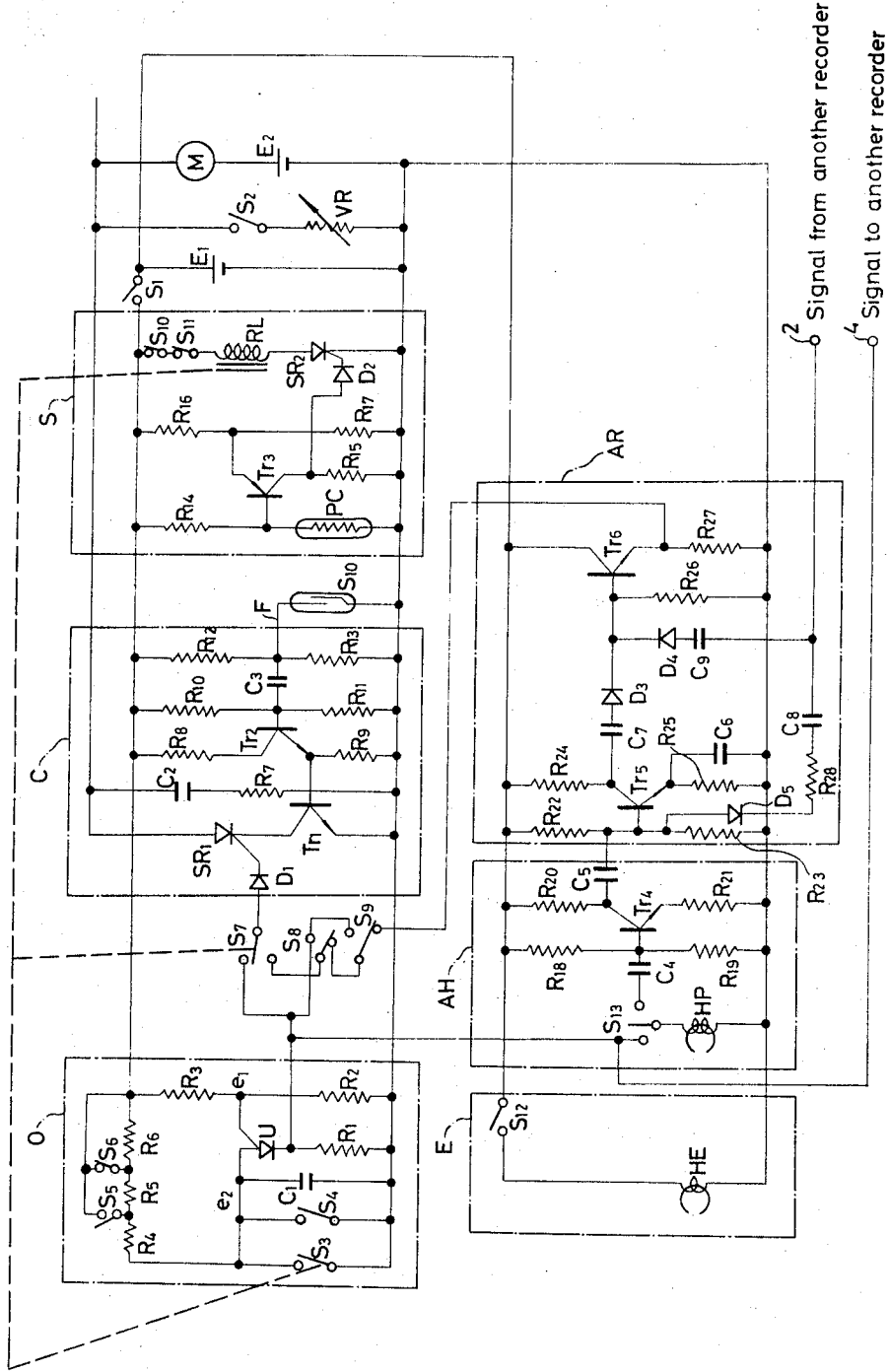
FIG. 2 is a circuit diagram showing one embodiment of the film-tape synchronization system according to the present invention.

Next referring to FIG. 2 in which same references indicate same elements as in FIG. 1, the oscillator O for producing the reference pulse signal in order to obtain a constant speed of the film speed at the projector side comprises a double base diode U, resistors $R_1$, $R_2$, $R_3$, $R_4$, $R_5$ and $R_6$, a capacitor C and switches $S_3$, $S_4$, $S_5$, and $S_6$. When the potential $e_2$ of a time constant circuit composed of the capacitor $C_1$ and normally the resistor $R_4$ and $R_5$ becomes larger than the potential $e_1$ determined by the resistors $R_2$ and $R_3$, the path between the anode of the double base diode U and the cathode of the diode U becomes conductive and the charge across the capacitor $C_1$ is discharged through the resistor $R_1$, and the capacitor $C_1$ reaches a residual charges in which no further discharge occurs and becomes ready to recharge. In this way charging and discharging across the capacitor $C_1$ is repeated to maintain oscillation in the oscillations. The switch $S_3$ controls the oscillator of the oscillator O, and the switch $S_4$ is associated with a relay coil $R_L$ in the sensing circuit S.

The switch $S_5$ serves to change the oscillation frequency to one corresponding to that produced by the resistor $R_4$ and the capacitor $C_1$ from the normal oscillation frequency. The switch $S_6$ serves to change the oscillation frequency from the normal frequency to a frequency corresponding to the resistors $R_4$, $R_5$ and $R_6$ and the capacitor $C_1$. The switches $S_8$ and $S_9$ are respectively associated with the switches $S_5$ and $S_6$. Thus a fine adjustment for the synchronization is attained by the operation of these switches $S_5$, $S_6$, $S_7$ and $S_8$ when the projector deviates from the reference pulse signal by a few frames. This adjustment is very useful for finely adjusted reproduction.

The switch $S_7$ is also associated with the relay coil $R_L$ and the switch $S_8$ and $S_9$ are associated with the switches $S_5$ and $S_6$.

Figure 3:
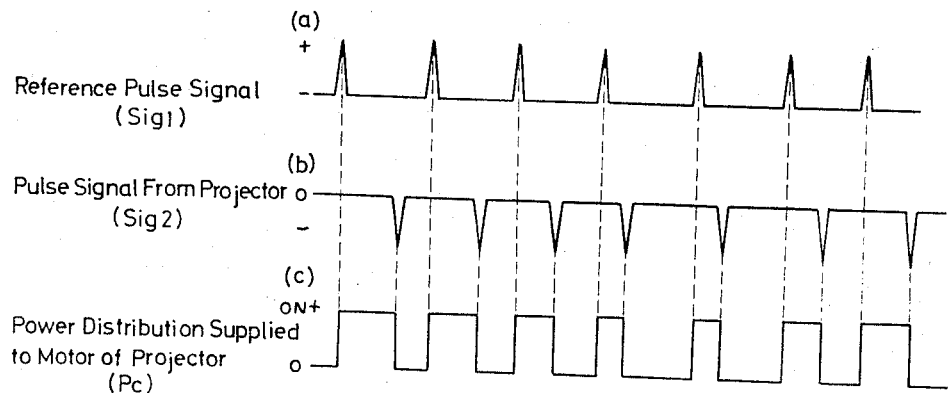
FIG. 3 is a graph illustrating power distribution (c) supplied to the projector with that (a) of reference pulse signals and that (b) of a pulse signal from the projector.

The control circuit C comprises a thyristor $SR_1$, transistors $Tr_1$ and $Tr_2$, a diode $D_1$, resistors $R_7$, $R_8$, $R_9$, $R_{10}$, $R_{11}$, $R_{12}$, and $R_{13}$, capacitors $C_2$ and $C_3$. The control circuit C controls the speed of the projector. The gate of the thyristor $SR_1$ receives a reference pulse signal $Sig_1$ as shown in FIG. 3 from the oscillator O or the magnetic tape and so on, and thereby the thyristor $SR_1$ is turned on. The transistor $Tr_1$ is biased in a normally conductive state by the transistor $Tr_2$. The transistor $Tr_2$ is also biased in a normally conductive state by the resistors $R_{10}$ and $R_{11}$. The reed switch $S_{10}$, provided at the projector side, is connected in parallel with the resistor $R_{13}$.

The reed switch $S_{10}$ senses the rotational speed of the projector P and becomes conductive to produce a differentiated negative pulse signal $Sig_2$ as shown in FIG. 3 through the capacitor $C_3$ and the resistor $R_{11}$. The differentiated negative signal $Sig_2$ renders the transistors $Tr_2$ and $Tr_1$ non-conductive for a moment to turn off the thyristor $SR_1$.

The control circuit C controls a rectangularly distributed power signal Pc supplied to the motor M in proportion to the phase difference between the reference pulse signal $Sig_1$ and the negative pulse signal $Sig_2$ whose repetition rate is in proportion to the speed of the projector. In case the phase difference between the reference pulse signal $Sig_1$ and the negative pulse signal $Sig_2$ fed back from the projector is large, namely in case the speed of the projector is lower than the speed corresponding to the reference signal, the power supply to the motor of the projector increases and the motor of the projector is accelerated to attain the standard speed. On the contrary, in case the phase difference between the reference pulse signal $Sig_1$ and the negative pulse signal $Sig_2$ fed back from the projector is small, namely in case the speed of the projector is higher than that corresponding to the reference pulse signal, the power $P_c$ supplied to the motor of the projector decreases and the motor of the projector is decelerated to attain the standard speed. When the voltage supplied to the motor of the projector becomes large and the speed of the motor of the projector becomes high, the phase difference between the reference pulse signal $Sig_1$ and the pulse signal $Sig_2$ from the projector becomes small. Thus the power Pc supplied to the motor is maintained constant to assure a constant speed of the motor of the projector.

While when the voltage becomes small, the phase difference between the reference pulse signal $Sig_1$ and the pulse signal $Sig_2$ from the projector becomes large, and thereby the power Pc supplied to the motor of the projector is maintained constant. Further, even when there is torque variation use to such as film leads, the projector speed is controlled to a speed corresponding to the reference pulse signal $Sig_1$.

The sensing circuit S comprises a transistor $Tr_3$, a thyristor $SR_2$, a relay coil RL, a photocell Pc, a diode $D_2$, resistors $R_{14}$, $R_{15}$, $R_{16}$ and $R_{17}$, and switches $S_{10}$ and $S_{11}$. The switch $S_{10}$ is associated with the switches $S_{12}$ and $S_{13}$, and the switch $S_{11}$ is associated with the switch $S_3$.

The notch or opening or a signal frame provided at a prescribed position of the film is detected by the photocell Pc and the output of the photocell Pc is amplified by the transistor $Tr_3$ to turn on the thyristor $SR_2$ and actuate the relay coil RL and keep it in its actuated state. The relay coil RL turns on the switch $S_3$ to stop the oscillation of the oscillator O and the relay coil RL actuates the driving means of the tape recorder. The actuation of the driving means is effected by pinching action of a pinch roller to a capstan as usually done by the closing action of a main switch of the driving circuit of the driving motor for the tape recorder.

The switch $S_7$ is provided for changing over the controlling circuit C from the oscillator O to the read amplifier AR.

The eraser circuit E comprises an eraser head HE for erasing the recorded signal of the tape and the switch $S_{12}$. The head amplifying circuit AH reproduces the reference pulse signal recorded on the magnetic tape etc., and comprises a magnetic head Hp, both for recording and playback, a transistor $Tr_4$, resistors $R_{18}$ $R_{19}$ $R_{20}$ and $R_{21}$, capacitors $C_4$ and $C_5$, and switches $S_{13}$. The magnetic head Hp both for recording and play-back serves as a recording head by changing over the switch $S_{13}$ for recording the reference pulse signal onto the magnetic tape.

The amplifier circuit AR amplifies the signal from the head amplifier circuit AH or converts the reference pulse signal from another recorder into a signal suitable to the controlling circuit C. This amplifying circuit AR comprises transistors $Tr_5$ and $Tr_6$, diodes $D_3$, $D_4$ and $D_5$, resistors $R_{22}$, $R_{23}$, $R_{24}$, $R_{25}$, $R_{26}$, $R_{27}$, and $R_{28}$ and capacitors $C_6$, $C_7$, $C_8$ and $C_9$. The signal from the amplifying circuit AH is directly amplified and supplied to the controlling circuit C through the switch $S_7$. As the controlling circuit C requires positive pulse signal, in case the reference pulse signal input to the terminal 2 from the another recorder is positive pulse, the pulse signal is supplied to the base of the transistor $Tr_6$ through the capacitor $C_9$ and the diode $D_4$ and the output a from the transistor $Tr_6$ is supplied to the controlling circuit C.

In case the reference pulse signal input to the terminal 2 from the another recorder is negative pulse, the pulse is supplied to the base of the transistor $Tr_5$ through the diode $D_5$ and the phase inversion is carried out and thereby the inverted output from the transistor $Tr_5$ is supplied to the controlling circuit C through the transistor $Tr_6$.

The resistor $R_{28}$ serves to decay the signal potential from the another recorder so as to match the output level from the transistor $Tr_6$ with that for the other output with no phase inversion. When the driving circuit for driving the motor of the projector synchronously is actuated together with the switches $S_1$ and $S_2$, the switch $S_1$ is maintained on while the switch $S_2$ is turned off. When the driving circuit for driving the motor of the projector synchronously is not actuated, the switch $S_1$ is off and the switch $S_2$ is on, and the speed of the projector P is selected freely by means of a variable resistor $VR_1$. $E_1$ is a power source for the system and $E_2$ is a power source for driving the motor of the projector.

The operation of the circuit shown in FIG. 2 is summerized for two cases.

1. When the reference pulse signal during the same period as the period required for the projection of the film is recorded previously from the oscillator O into the tape of the tape recorder T.

In this case, the period required for projection of the film is previously measured. The reference pulse signal $Sig_1$ is recorded from the oscillator O for the period on the recording tape etc. of the tape recorder T from the magnetic head $Hp$ for recording and reproducing in the amplifier AH, or on the recording tape etc. of the another recorder from the output terminal 4 for the another recorder. Next the start position of a scene of the film is made ready for starting the projection by means of the notch or opening or signal frame, and the start position of the tape etc. recorded in this way is also preset for its starting. At this instance, when the initial setting is performed. The notch or opening or signal frame of the scene strictly corresponds to the first pulse signal of the reference pulse signal on the tape.

When the film is set in the projector P and the oscillator O starts its oscillation, the reference pulse signal $Sig_1$ is delivered to the controlling circuit C to start the projector P, and the signal $Sig_2$ in proportion to the seed of the projector is fed back to the controlling circuit C through the feedback path F by the reed switch $S_{10}$ set in the projector P, and thereby the projector P is caused to move at a constant speed by the reference pulse signal $Sig_1$. When the next notch or opening or signal fame passes the front of the photocell $Pc$, the output of the photocell is amplified by the transistor $Tr_3$ to actuate the thyristor $SR_2$ and thereby to actuate the relay coil RL. The switch $S_3$ associated with the relay coil RL becomes on at this instance, and the oscillator O stops its oscillation to stop the projector P. In this way the film in the projector is set precisely at a next start position of the next scene. The switch $S_7$ also associated with the relay coil RL is changed over from the oscillator O to the amplifier AR. At this moment, when the tape recorder T is started, the reference pulse signal previously recorded is reproduced by means of the head Hp and supplied to the controlling circuit C the amplifier circuit through the converting circuit on the amplifier circuit AR the diode $D_4$ or $D_5$ etc. when the first pulse of the reference pulse signal from the tape recorder T or from the another recorder reaches the controlling circuit C, the circuit C start its actuation, and at the same time the projector P starts its actuation. In this case the tape speed corresponding to the reference pulse signal recorded on the magnetic tape or the recording material of the another recorder corresponds to the speed of the projector, namely the film speed is 1 to 1 onto mapping of the tape speed. Therefore, when sound required for each cut or each frame of the film is recorded on the portion other than the recorded track for the reference pulse signal is recorded on the magnetic tape of the tape recorder T or on the recording material of the another recorder, the sound strictly corresponding to each frame or each cut of the film is recorded. By reproducing the film and the magnetic tape provided in the above way, the projected image and the reproduced sound are precisely synchronized.

2. In case of using a magnetic tape etc. having no recorded signal.

In this case, by a notch or opening or signal frame is provided at the start portion of the scene of the film and the magnetic tape is set in the tape recorder T or the another recorder. As previously described, the switch $S_3$ of the oscillator O is made off for actuation of the oscillator O for actuation of the projector P. In this way the notch or opening or signal frame is set at its start position as described before. In this state, the tape recorder T or the another recorder is set for its recording and the recording is started. And then the switches $S_{10}$, $S_{12}$ and $S_{13}$ are changed over to the recording side of the reference pulse signal to turn on the switch $S_{12}$ and thereby to connect the switch $S_{13}$ to the oscillator O. Thus the head Hp is set for recording and ready for recording and at the same time the relay coil RL kept at its actuation state by the thyristor $SR_2$ is reset or dienergized by the switching off of the switch $S_{10}$ and the switch $S_4$ associated with the relay coil RL is made off to produce the reference pulse signal $Sig_1$ from the oscillator O. And the change over switch $S_7$ also associated with the relay coil RL is changed over from the amplifier circuit to the oscillator O to supply the reference pulse signal $Sig_1$ to the controlling circuit C and also to the head Hp. In this way the signal corresponding to the film is recorded on the magnetic tape. During this recording, sound corresponding to frames or cuts of the film is effectively recorded on portions other than the portion having recorded pulse signal.

In this case also a strict reproduction is attained in a one-to-one onto mapping manner as described previously. The foregoing description has been made on reproduction of the cinematographic film by means of a cinematographic projector. However, the present invention is not limited to the above, but is also useful for reproducing synchronously recorded sound with recorded film during projector, and recording the sound corresponding to the object to be photographed at the very time of photographying by controlling a cinematographic camera through the controlling circuit C at a constant speed in stead of controlling the projector by the reference pulse signal from the oscillator or recorded on the tape at the time of shooting.

What is claimed is:

1. A system for recording and reproducing audiovisual information by synchronizing a projector for projecting images recorded on a film with recorder means for recording and reproducing sound signals, comprising electric signal generator means for selectively generating electrical signals which are regular and independent of the feed of the film, said generator means having switching means for enabling and disabling said generator means, said film having a start index, a detector coupled to said switching means for detecting the start index and causing said switching means to disable said generator means after detecting the start index, driving means for feeding the film of the projector, and control means for actuating and controlling said driving means, said driving means having a driving circuit, said control means having a switching circuit connected to the driving circuit of said driving means, said switching circuit means being connected electrically to the output of said generator means.

2. A system as in claim 1, wherein said reproducing means has a tape for recording sound signals on which synchronizing signals are recorded in a predetermined relationship with the sound signals, said reproducing means including a detector for detecting synchronizing signals recorded on the tape of the reproducing means, said output means selectively connected to said switching circuit means.

3. A system as in claim 1, wherein said switching circuit means includes a pair of switching elements connected in series, one of said elements being made conductive by the output of said generator means, the other of said elements being made conductive synchronously by the film feed of the projector.

4. A system as in claim 1, wherein said switching circuit means includes a pair of switching circuit elements connected in series, a differentiation circuit responsive to the film feed of the projector, said differentiation circuit opening and closing one of said elements, the other of said elements being open and closed by the output of said generator means.

5. A system for synchronizing movement of film in a projector with a sound track wherein the film has a starting index and the sound track has a signal portion, said system comprising control means responsive to timing signals and to the speed of the film movement in the projector for actuating the projector at a speed depending on the relationship between the rate of the timing signals and the speed of the projector and for stopping the projector in the absence of timing signals, timing signal generator means for generating timing signals, switch means for coupling said generator means to said control means so that said control means actuates the projector and moves the film, electrical means for carrying timing signals from the signal portion of the sound track, sensing means responsive to the appearance of the index on the film for causing said switch means to decouple said control means from said generator means and to couple the control means to said electrical means after the sensing means senses the index so as to end the timing signals to the control means until timing signals arrive on said electrical means.

6. A system as in claim 5, further comprising electrical means for connecting said generator means to the signal portion of the sound track so as to record the timing signals on the signal portion of the sound track.

7. A system as in claim 5, wherein said generator means includes a second switch means responsive to said sensing means for suppressing the timing signals in said generator means after said sensing means has sensed the index.

8. A system as in claim 7, further comprising electrical means for connecting said generator means to the signal portion of the sound track so as to record the timing signals on the signal portion of the sound track.

9. A system as in claim 5, wherein said sound track is in the form of a tape, ad further comprising tape recording means couplable to said generator means for recording the timing signals from said generator means onto the sound track while sound is being recorded on the sound track, said tape recorder means being connectable to said electrical means for reproducing the timing signals and applying them to said control means through said electrical means when said control means is connected to said electrical means by said switch means.

10. A system for presenting audiovisual information so that a projector for projecting images recorded on a film is synchronized with a tape recorder for producing sound signals, comprising electric signal generator means for selectively generating electrical signals which are regular and independent of the feed of the film, driving means for feeding the film in the projector, control means for actuating and controlling said driving means, said control means having an electrical source and switching circuit means connected between the driving means and the electrical source, the film having a start index, detector means for detecting a start index carried on the film, reproducing means for reproducing the synchronizing signals recorded in a certain positional relationship with the sound signals on the tape of the tape recorder, and switch means for selectively connecting said switching circuit means to one of said reproducing means in said generator means, said switch means connecting said switching circuit means to said generator means before said detecting means detects the start index and connecting said switching circuit means to said reproducing means after said detector means senses said start index.

11. A system as in claim 10, wherein said generator means includes a switch for enabling and disabling said generator means, said switch being connected to said detector for disabling said generator means when said detector detects the start index.

12. A system as in claim 10, wherein said switching circuit means includes a switch member responsive to the speed of the film, differentiation circuit means connected to said switch member, and a second switch member connected to said driving means and rendered conductive by the output of one electrode of said differentiation circuit.

13. A system as in claim 12, wherein said switching circuit means includes a third switching member connected with the second switching member in series with the second switching member, said third switching member being rendered conductive by the output of said generator means.

14. A system as in claim 13, wherein said second switching member is a transistor and said third switching member is a thyristor.

\* \* \* \* \*